United States Patent
Minopoli et al.

(10) Patent No.: US 6,742,688 B2
(45) Date of Patent: Jun. 1, 2004

(54) TENSIONING DEVICE FOR THE FASTENING BELT OF THE COMPRESSED GAS BOTTLES TO THE BACK OF A JACKET OR THE LIKE FOR UNDERWATER ACTIVITY

(75) Inventors: Giuseppe Minopoli, Naples (IT); Giovanni Garofalo, Rapallo (IT)

(73) Assignee: HTM Sport S.p.A. (IT)

( * ) Notice: Subject to any disclaimer, the term of this patent is extended or adjusted under 35 U.S.C. 154(b) by 5 days.

(21) Appl. No.: 10/103,800

(22) Filed: Mar. 25, 2002

(65) Prior Publication Data

US 2002/0139827 A1 Oct. 3, 2002

(30) Foreign Application Priority Data

Mar. 30, 2001 (IT) .................... GE20010006 U

(51) Int. Cl.[7] .................... B63C 11/22; F16L 37/06; A62B 9/04
(52) U.S. Cl. .................... 224/651; 24/483; 405/186
(58) Field of Search .................... 224/651; 24/483; 137/614.06, 615.05; 405/186

(56) References Cited

U.S. PATENT DOCUMENTS

| | | | |
|---|---|---|---|
| 3,731,705 A | | 5/1973 | Butler |
| 4,004,777 A | * | 1/1977 | Despas .................... 254/51 |
| 4,388,947 A | * | 6/1983 | Steuerwald ............ 137/614.06 |
| 5,218,745 A | | 6/1993 | Hollis et al. |
| 5,626,439 A | | 5/1997 | Rowlands |
| 5,664,980 A | * | 9/1997 | Lin .................... 441/92 |

FOREIGN PATENT DOCUMENTS

GB          776838          6/1957

* cited by examiner

Primary Examiner—Sue A. Weaver
(74) Attorney, Agent, or Firm—Stites & Harbison PLLC; Marvin Petry

(57) ABSTRACT

A tensioning device for the fastening belt of compressed gas bottles to the back of a jacket or the like for underwater activities. A pneumatic jack is inserted between the two ends of the bottle fastening belt and connected to a suitable compressed gas source through at least one hose provided with a joint for connection with the jack. The jack is fit to supply an optimal tensioning strength of the belt for its tightening on the bottles. The pneumatic jack is connected to the joint through a coupling device which is manually controllable by the diver to allow the supplying of compressed air to the jack through the opening of a suitable valve positioned in the joint.

20 Claims, 4 Drawing Sheets

TENSIONING DEVICE FOR THE FASTENING BELT OF THE COMPRESSED GAS BOTTLES TO THE BACK OF A JACKET OR THE LIKE FOR UNDERWATER ACTIVITY

FIELD OF THE INVENTION

The invention relates to a tensioning device for the fastening belt of compressed gas bottles to the back of a jacket or the like for underwater activity.

BACKGROUND OF THE INVENTION

The present invention relates to a tensioning device for the fastening belt of compressed gas bottles to the back of a jacket or the like for underwater activity. European Patent Application Number 1 103 460 A2 filed on Oct. 10, 2000, shows a tensioning device for the fastening belt of compressed gas bottles to the back of a jacket or the like for underwater activity. That device includes a pneumatic jack inserted between the two ends of the fastening belt and it is connected to a suitable compressed gas source, so as to supply an optimal tensioning strength of the belt for its tightening on the bottle. The connection is obtained through a suitable hose provided with a coupling joint with a suitable nipple of the jack. The device has disadvantages, in fact in the very moment the hose is connected to the jack nipple through the coupling joint, the pneumatic jack immediately starts to tighten the belt. This instantaneous starting can cause problems, such as for instance the unintentional insertion beneath the belt of jacket parts or even a diver's hand, which would be caught by force between the belt and the bottle.

SUMMARY OF THE INVENTION

A goal of the present invention is to overcome the disadvantages of the above mentioned known tensioning device through a tensioning device for the fastening belt of the compressed gas bottles to the back of a jacket or the like for underwater activities, including a pneumatic jack inserted between the two ends of said bottle fastening belt and connected to a suitable compressed gas source through at least one hose provided with a joint for connection with the jack, which is fit to supply an optimal tensioning strength of the belt for its tightening on the bottle itself, the pneumatic jack being connected to the joint through a coupling device provided with means manually controllable by the diver to allow the supplying of compressed air to the jack through the opening of a suitable valve positioned in joint.

Then, through the coupling device of the present device, the diver will be advantageously able to manually control the compressed air supplied to the jack at a time after the connection of the joint with said coupling device, with a remarkable increase of his security, avoiding the risks previously described in the known devices.

BRIEF DESCRIPTION OF THE DRAWINGS

Further aims and advantages of the present invention will be better understood through the following description, to be considered as illustrative and not limitative descriptions and with reference to the enclosed drawings, where.

Figure 1:
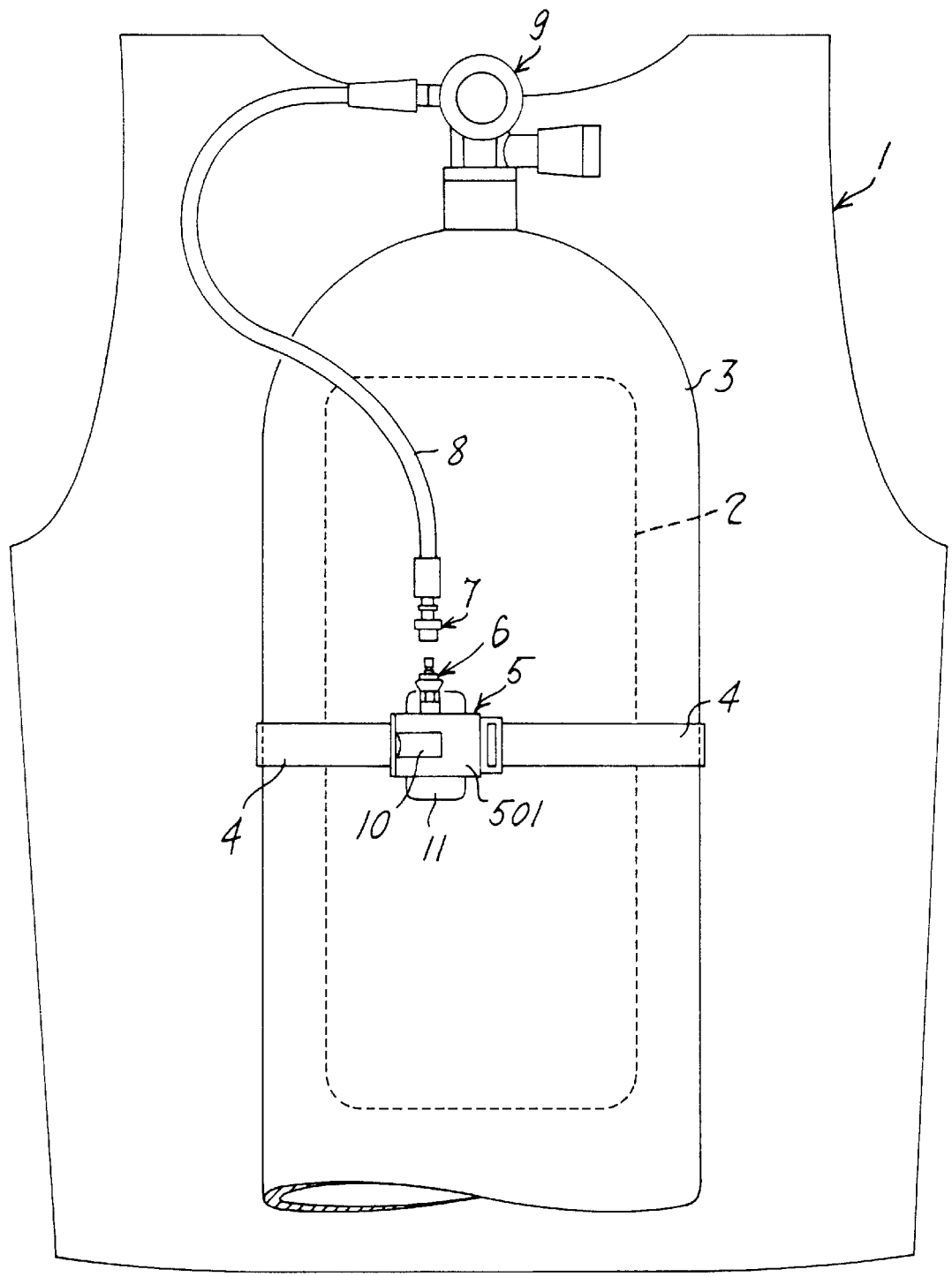
FIG. 1 shows an elevation view of the rear part of a jacket to which a bottle is fastened by a belt tensioned by the present device.

DETAILED DESCRIPTION OF THE PREFERRED EMBODIMENTS reference to the figures, and in particular to FIG. 1, 1 shows a jacket including on its rear part a stiff back 2 to which is tightly attached a compressed air bottle 3 through a belt 4, tensioned by a pneumatic jack 5 connected through a coupling device 6 to a quick coupling 7 fastened to an end of a hose 8, whose other end is connected to the first reduction stage 9 of bottle 3. The jack 5 includes a casing 501 on the outer side of which is positioned a lever 10 for releasing the belt 4 of jack 5. On the inner side of the casing 501 there is provided a bent plate 11 for supporting the jack 5 onto the bottle 3. As is well-known, the fastening of the bottle 3 to the back 2 of the jacket 1 is performed first by winding the belt 4 on the bottle 3, making it pass between the jacket 1 and the back 2 and, then, closing the connection between the hose 8 and pneumatic jack 5 so that it is supplied with compressed air and is able to tighten the belt 4 to obtain optimal tension.

Figure 2:
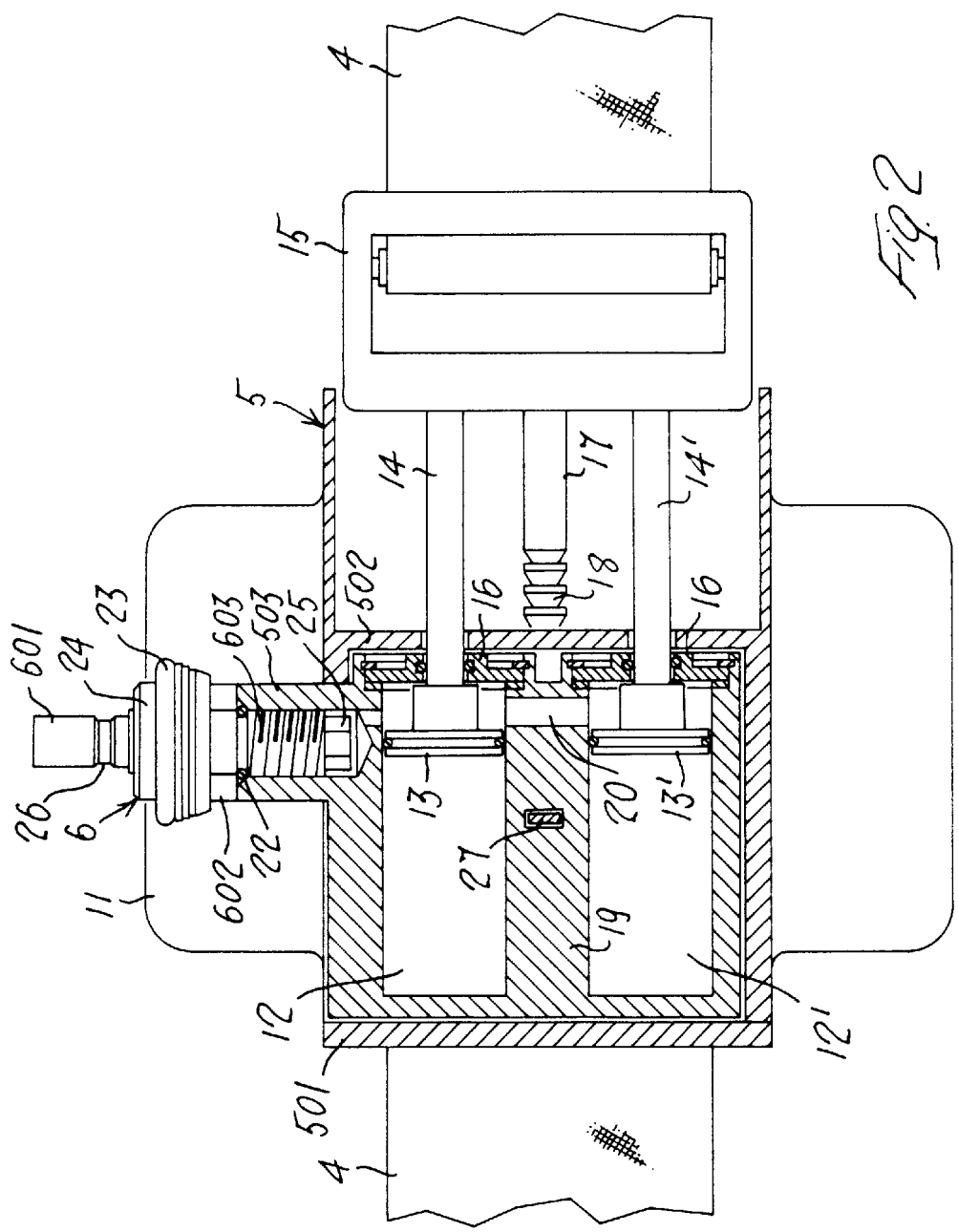
FIG. 2 shows an enlarged and sectional view of the tensioning device of FIG. 1, provided with a pneumatic jack connected through coupling means to a hose for the intake of compressed air from the bottle.

FIG. 2 shows in section the pneumatic jack 5 including in the casing 501 two cylinders 12 and 12' within which airtightly slide two pistons 13 and 13' provided with two stems 14 and 14' articulately connected to a buckle 15 of the belt 4. The stems 14 and 14' pass through a head wall 502 of the casing 501 and are provided with sealing rings 16. To the buckle 15 is also articulately connected an arm 17 having one end provided with teeth 18 going into the casing 501 through the head wall 502. The two cylinders 12 and 12' are divided by a central partition 19 and interconnected by a duct 20 through which it is possible to contemporaneously supply both cylinders with compressed air and then, in a known way, to push to the left the two pistons 13 and 13' to tighten the belt 4. The coupling device 6 includes a hollow upper cylindrical pin 601, a hexagonal section base 602 for supporting and screwing the coupling device 6 to the casing 501 and a threaded end part 603, coupled to a threaded seat 503 formed in a wall of the casing 501. A sealing ring 22 is provided between the end part 603 of the coupling device 6 and the threaded seat 503. The compressed air is supplied to the cylinders 12 and 12' through a check valve 25 screwed within the end part 603 of the coupling device 6. On the hollow pin 601 is fitted a sleeve 23 which can move vertically relative to the pin 601 and is supported by the base 602. Around the hollow pin 601 is also fastened a bushing 24, on which, as it will be seen below, the sleeve 23 can slide. The pin 601 is moreover provided with a groove 26 co-operating with fastening means, known per se, of the quick coupling 7.

Figure 3:
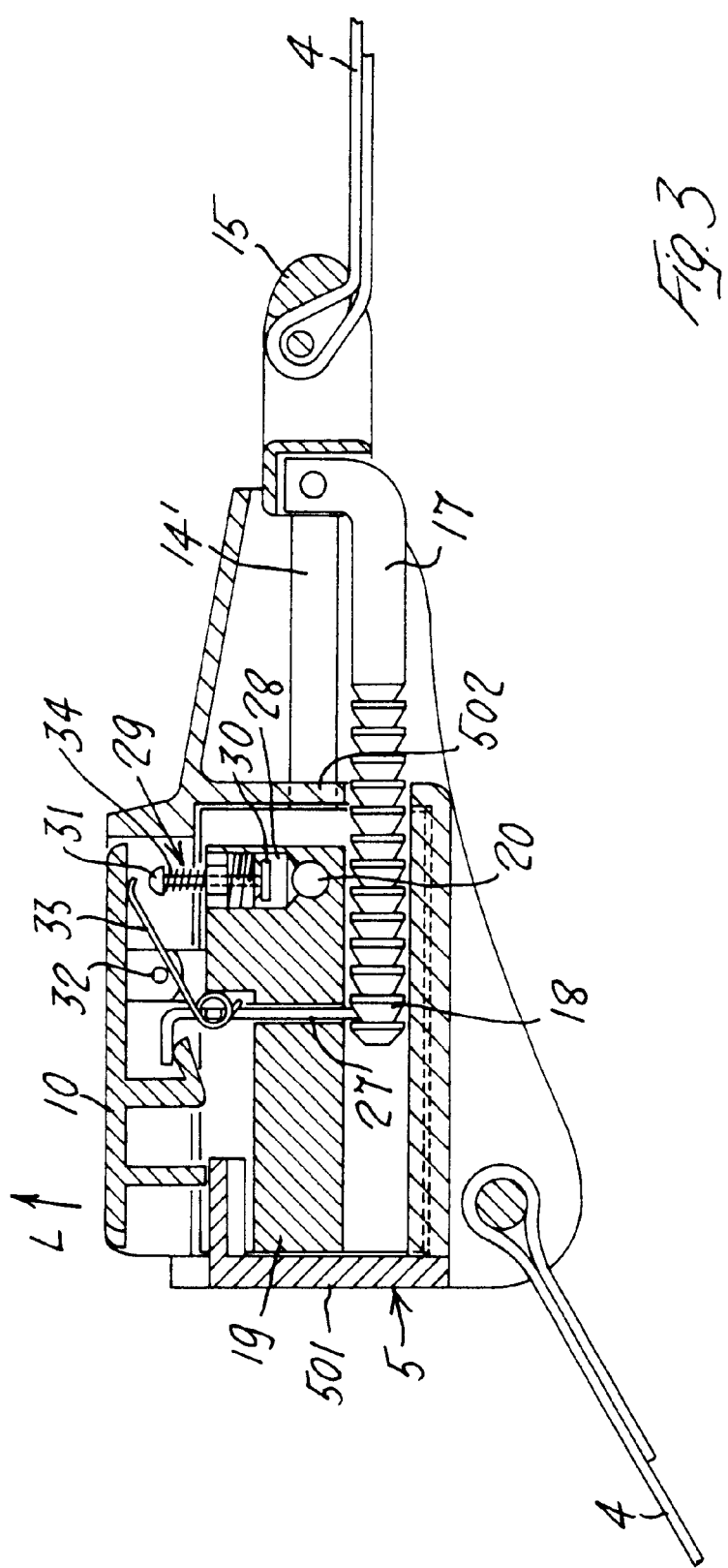
FIG. 3 shows a bottom and sectional view of the tensioning device of FIG. 1.

FIG. 3 shows a bottom and sectional view of the tensioning device of the belt 4. As mentioned, in tightening the belt 4 of FIG. 1, air is supplied to the two cylinders 12 and 12' through the duct 20 in the partition 19. When the pistons 13 and 13' begin to slide to the end of the cylinders 12 and 12', the arm 17 goes into the jack 5 casing 501 and the teeth 18 snap couple with one end of a snug 27, which crosses the central partition 19 and whose other end co-operates with the release lever 10. The release lever 10 can rotate around a pin 32 against the action of a spring 33, which maintains lever 10 in the lowered position shown in figure and which is fixed to one end of the snug 27 and at its other end engages the inner part of the release lever 10. The central partition 19 includes on the duct 20 a seat 28 in which is housed a valve 29 for the exhausting of air from the cylinders, which is provided with a shutter 30 provided with an elastic return means 34. The release lever 10 is fit to allow at the same time the exhausting of the air from the cylinders through the valve 29 and the unlocking of the belt 4 tightening mechanical security arm 17. When the diver wants to release the belt and free the bottle, he grips the lever 10, making it rotate in the direction of the arrow L around the pin 32 against the action of the spring 33, causing an upward translation of the snug 27, which frees the arm 17, and a contemporaneous lowering of the head 31 of the shutter 30, which allows the air contained in the cylinders 12 and 12' to flow out of the duct 20 and then flow out of the exhaust valve 29. By releasing the release lever 10, the shutter 30 of said exhaust valve 29 will return to the closing position by means of the elastic returning means 34 and the spring 33 will bring said lever 10 back to its lowered position, as in the figure.

Figure 4:
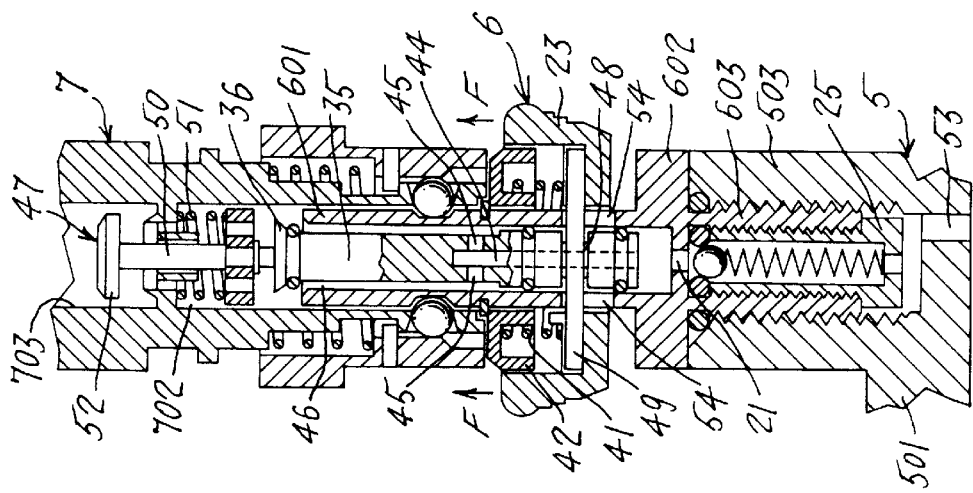
FIG. 4 shows a sectional view of the coupling means of the pneumatic jack to the hose, during a phase of closing of the air supply.
Figure 5:
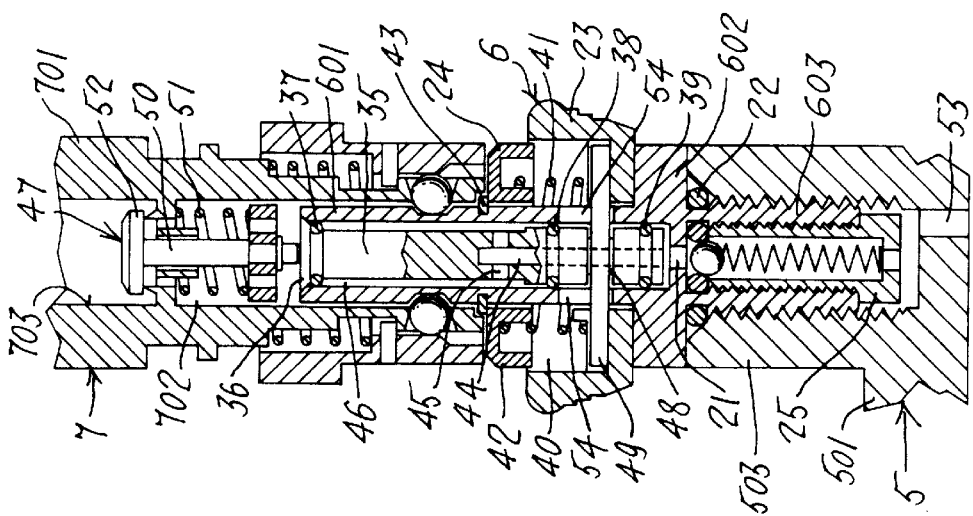
FIG. 5 shows a sectional view of the coupling means of the pneumatic jack to the hose, during a phase of opening of the air supply.

FIGS. 4 and 5 show in detail the coupling device 6 connected to the coupling joint 7 respectively in a closing and opening position of the check valve 25 for the feeding of compressed air to the cylinder 12 and 12' of the pneumatic jack 5. Within the hollow cylindrical pin 601 there is inserted a shaft 35 having at its upper end a conical frustum shutter 36, which closes the upper opening of said hollow pin 601 and is provided with a sealing ring 37. Between said shaft 35 and the hollow pin 601 there is provided a cavity 46 where there are provided two other sealing rings 38, 39. The sleeve 23 is internally provided with a cylindrical seat 40 which can slide on the bushing 24 and where there is housed one end of a compression spring 41, whose other end is housed in a seat 42 provided in the bushing 24. Bushing 24 is locked in position by a ring 43 housed on the outer surface of the hollow pin 601. As can be seen the shaft 35 has an inner axial duct 44 starting from the lower end of the shaft 35 and interrupted at the level of two radial holes 45 from which, as it will be described below, the air enters into said duct 44, leaving the cavity 46 provided between the shaft 35 and the inner wall of the hollow pin 601. Axially aligned with the hole 44 on the supporting base 602 of the joining device 6 there is provided one hole 21 for air entering into the check valve 25. On the outer surface of the shaft 35, there is provided an annular groove 48 through which is inserted tangentially relative to the shaft body a tubular arm 49 projecting practically the entire width of the seat 40 of sleeve 23 and fit to allow vertical translation of the shaft 35 following an upward movement of the sleeve 23 relative to the pin 601 and the bushing 24. The tubular arm 49 passes through two substantially rectangular slots 54 provided along the wall of the cylindrical pin 601, the slots 54 having a vertical extension such to allow a suitable upward movement of the tubular arm 49. The coupling joint 7 is connected to the hose 8. The joint 7 includes a main body 701 where there is provided an axial hole 702 where there is inserted the pin 601 of the coupling device 6. The axial hole 702 is closed by a valve 47 for the supplying of the compressed air coming from a duct 703 communicating with the hose 8 feeding air from the bottle. Valve 47 includes a shutter 50 provided with elastic return means 51 and including a lower end co-operating with the closing shutter 36 of the upper part of the hollow pin 601 and an upper head 52 which closes the passage where the compressed air enters into the hole 702. The fastening means of said coupling joint 7 to the cylindrical pin 601, as mentioned, are well-known, and therefore will not be further described. On the lower part of the figure check valve 25 can be seen, inserted in the end part 603 of the coupling device 6, allowing the entering of air to the cylinders 12, 12' through a duct 53 provided in said casing 501.

FIG. 5 shows the phase when compressed air is supplied to the cylinders 12 and 12'. When the diver decides to tighten the belt 4 to fasten the bottle 3 to the back 2, he just has to fix the coupling joint 7 on the coupling device 6 of the pneumatic jack 5 and, to allow the compressed air entering to the cylinders 12 and 12'. The driver then manually operates a control mechanism to open the valve 36 to allow compressed gas to flow through the joint 7 and through the check valve 25. Specifically, the operator lifts with his fingers the sleeve 23 in the direction of the arrows F along the pin 601 and the bushing 24 against the action of the spring 41, in rest position till now, so that the tubular arm 49 makes the whole stroke in the slots 54 of the pin 601 and, being engaged in the annular grove 48, causes an upward vertical translation of the shaft 35 within the fixed pin 601. Consequently the shutter 36 of said shaft 35 rises and presses on the lower end of the shutter 50 of the supplying valve 47 of the joint 7, so that, against the action of the elastic return means 51, the head 52 of said shutter 50 rises and allows the passing of compressed air from the duct 703, communicating with the hose 8, to the joint 7 axial hole 702. Now the compressed air can go through the cavity 46, enter the radial holes 45, the axial duct 44, the hole 21 in the base 602 and reach the check valve 25, which will supply it to the cylinders 12 and 12' for the driving of the relative pistons 13, 13' and the mechanical security arm 17 of the tightening of the belt 4.

When the diver has supplied to the pneumatic jack 5 a quantity of compressed air sufficient to obtain the required tightening of the belt 4, he has just to release the sleeve 23 so that the spring 41 automatically makes it return to the position of FIG. 4, with consequent lowering of the shaft 35, and then of the shutter 36 too, which will allow the elastic return means to close the compressed air supplying valve 47.

As it can be seen from the preceding description the advantages resulting from the use of a tensioning device of the fastening belt of the compressed air bottles to the back of a jacket or the like for underwater activities according to the embodiments described as examples are many, and other embodiments can be adopted to obtain said advantages without departing from the invention.

We claim:

1. A tensioning device for the fastening belt of a compressed gas bottle onto the back of a jacket, comprising:

a pneumatic jack inserted between the two ends of the belt, connectable to a compressed gas source for supplying compressed gas to the jack, the connection of the pneumatic jack to the compressed gas source including a coupling device fixed to the jack and in communication with the interior thereof, and a separable coupling joint connectable to the coupling device and communicating at its other end with a compressed gas source, a manually operable control mechanism mounted on the fixed coupling device and including a part located exterior of the fixed coupling device so as to be easily accessible to the diver, such that a diver can, with the pneumatic jack mounted on him and the fixed coupling device and the separable coupling joint connected together, operate the control mechanism to place the compressed gas source into communication with the interior of the jack.

2. A tensioning device according to claim 1, said manually operable control mechanism including a sleeve surrounding the coupling device and slidable therealong in one direction to place the compressed gas source into communication with the interior of the jack and including a resilient means urging the sleeve in the opposite direction to close any communication from the compressed gas source to the interior of the jack.

3. A tensioning device according to claim 1, wherein the coupling device includes a hollow pin fixed to the coupling device and a shaft located within the hollow pin and having a shutter at its upper end positioned to open and close the top of the hollow pin, wherein the manually operable control mechanism operatively engages the shaft to open and close the upper end of the hollow pin.

4. A tensioning device according to claim 3, said manually operable control mechanism including a sleeve surrounding the coupling device and slidable therealong in one direction to place the compressed gas source into communication with the interior of the jack and including a resilient means urging the sleeve in the opposite direction to close any communication from the compressed gas source to the interior of the jack.

5. A tensioning device according to claim 4, including an arm connecting the sleeve to the shaft to raise the shaft upon upward movement of the sleeve.

6. A tensioning device according to claim 5, including a seat in the bottom of the sleeve, said arm resting on the seat and extending through openings in the hollow pin and the shaft to operatively engage the shaft, and said resilient means comprising a spring urging the arm and hence the sleeve and shaft downwardly.

7. A tensioning device according to claim 6, wherein the pin includes two elongated slots for receiving the arm and permitting the arm to rise up and come down to raise and lower the shaft.

8. A tensioning device according to claim 3, wherein the coupling joint includes a compressed gas supply valve, and the shutter at the upper end of the shaft cooperates with the supply valve to open and close the supply valve as it opens and closes the top of the pin, respectively.

9. A tensioning device according to claim 8, including a cavity between the shaft and the hollow pin for the passage of compressed gas from the supply valve, and at least one axial duct in the shaft which communicates with the cavity for delivering compressed gas to the jack.

10. A tensioning device according to claim 8, wherein the shaft includes at least one sealing ring connected to said shutter.

11. A tensioning device according to claim 10, including a cavity between the shutter and the hollow pin for the passage of compressed gas coming from the supply valve, at least one axial duct in the shaft which communicates with the cavity for delivering compressed gas to the jack, and sealing rings positioned between the shaft and the hollow pin at a level below the communication of the cavity and said duct.

12. A tensioning device according to claim 11, wherein the coupling device includes at the bottom thereof a threaded part screwed in a seat in the jack, and a check valve located within the threaded part, which check valve opens against a resilient force to deliver compressed gas delivered from the cavity and the axial duct to the interior of the jack.

13. A tensioning device according to claim 12, including a supporting and screwing base of the coupling device located between the threaded part and the hollow pin and including at least one hole for the passing of compressed gas coming from the duct of the shaft.

14. A tensioning device according to claim 12, including a sealing ring between the supporting base and the of the jack.

15. A tensioning device according to claim 1, wherein the jack includes a plate suitably shaped to support a bottle.

16. A tensioning device according to claim 1, wherein the jack includes at least one cylinder and a piston slidable therein and in fluid communication with the coupling device and the coupling joint to be driven by compressed air passing therethrough, and including a mechanical lock which prevents loosening of the belt from the level of tightness caused by the jack and including release means for simultaneously exhausting air from the cylinder and releasing the mechanical lock.

17. A tensioning device according to claim 16, wherein the release means includes a lever hinged to the jack and cooperating with an air exhausting valve from the cylinder and with the mechanical lock.

18. A tensioning device for the fastening belt of a compressed gas bottle onto the back of a jacket, comprising:
a pneumatic jack inserted between its two ends of the belt and a connection for connecting the interior of the jack to a compressed gas source,
an exhaust valve for exhausting pressurized gas from the interior of the jack to loosen the belt,
a mechanical lock which prevents loosening of the belt from the level of tightness caused by the jack,
and a release mechanism operatively connected to both the exhaust valve and the mechanical lock, such that operation of the release mechanism both opens the exhaust valve and releases the mechanical lock.

19. A tensioning device according to claim 18, said release mechanism comprising a lever mounted for rotation about an axis fixed to the jack, one end of the lever operatively connected to a snug of the mechanical lock and the other end operatively connected with the exhaust valve.

20. A tensioning device according to claim 19, wherein the jack comprises a pair of cylinders and pistons slidable therein, a partition separating the cylinders, and both the exhaust valve and the snug are located in the partition.

* * * * *